US012568238B2

(12) United States Patent
Hendry et al.

(10) Patent No.: US 12,568,238 B2
(45) Date of Patent: Mar. 3, 2026

(54) METHOD FOR IMAGE CODING BASED ON SIGNALING OF INFORMATION RELATED TO DECODER INITIALIZATION

(71) Applicant: LG Electronics Inc., Seoul (KR)

(72) Inventors: Hendry Hendry, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 70 days.

(21) Appl. No.: 18/278,113

(22) PCT Filed: Apr. 12, 2022

(86) PCT No.: PCT/KR2022/005277
§ 371 (c)(1),
(2) Date: Aug. 21, 2023

(87) PCT Pub. No.: WO2022/220541
PCT Pub. Date: Oct. 20, 2022

(65) Prior Publication Data
US 2024/0056591 A1 Feb. 15, 2024

Related U.S. Application Data

(60) Provisional application No. 63/174,023, filed on Apr. 12, 2021.

(51) Int. Cl.
| | |
|---|---|
| *H04N 19/44* | (2014.01) |
| *H04N 19/136* | (2014.01) |
| *H04N 19/172* | (2014.01) |
| *H04N 19/184* | (2014.01) |
| *H04N 19/186* | (2014.01) |
| *H04N 19/70* | (2014.01) |

(52) U.S. Cl.
CPC ........... *H04N 19/44* (2014.11); *H04N 19/136* (2014.11); *H04N 19/172* (2014.11); *H04N 19/184* (2014.11); *H04N 19/186* (2014.11); *H04N 19/70* (2014.11)

(58) Field of Classification Search
CPC .... H04N 19/44; H04N 19/136; H04N 19/172; H04N 19/184; H04N 19/186; H04N 19/70; H04N 19/423
See application file for complete search history.

(56) References Cited

U.S. PATENT DOCUMENTS

| | | | |
|---|---|---|---|
| 11,381,867 B2 * | 7/2022 | Stockhammer | .... H04N 21/4431 |
| 2021/0306638 A1 * | 9/2021 | Kang | ................... H04N 19/105 |

(Continued)

*Primary Examiner* — Dramos Kalapodas
(74) *Attorney, Agent, or Firm* — Fish & Richardson P.C.

(57) ABSTRACT

An image decoding method performed by a decoding apparatus according to the disclosure of the present document may comprise the steps of: obtaining information related to decoder initialization from a bitstream, initializing a decoder on the basis of the information related to decoder initialization; and performing decoding after initializing the decoder, wherein the information related to decoder initialization includes one or more decoder initialization information sets, and the decoder initialization information set includes level id information and maximum value information of parameters for decoding a bitstream related to the level id information, the value of the level id information specifying a level related to the decoder initialization information set.

7 Claims, 9 Drawing Sheets

(56)  References Cited

U.S. PATENT DOCUMENTS

| | | | |
|---|---|---|---|
| 2021/0321140 A1* | 10/2021 | Zhang | H04N 19/50 |
| 2022/0232256 A1* | 7/2022 | Wang | H04N 19/70 |
| 2023/0015840 A1* | 1/2023 | Sánchez De La Fuente | H04N 21/8451 |
| 2023/0069585 A1* | 3/2023 | Paluri | H04N 19/172 |
| 2023/0115541 A1* | 4/2023 | Deng | H04N 19/102 375/240.26 |
| 2023/0336753 A1* | 10/2023 | Wang | H04N 7/014 |
| 2023/0336798 A1* | 10/2023 | Sánchez De La Fuente | H04N 21/8456 |

* cited by examiner

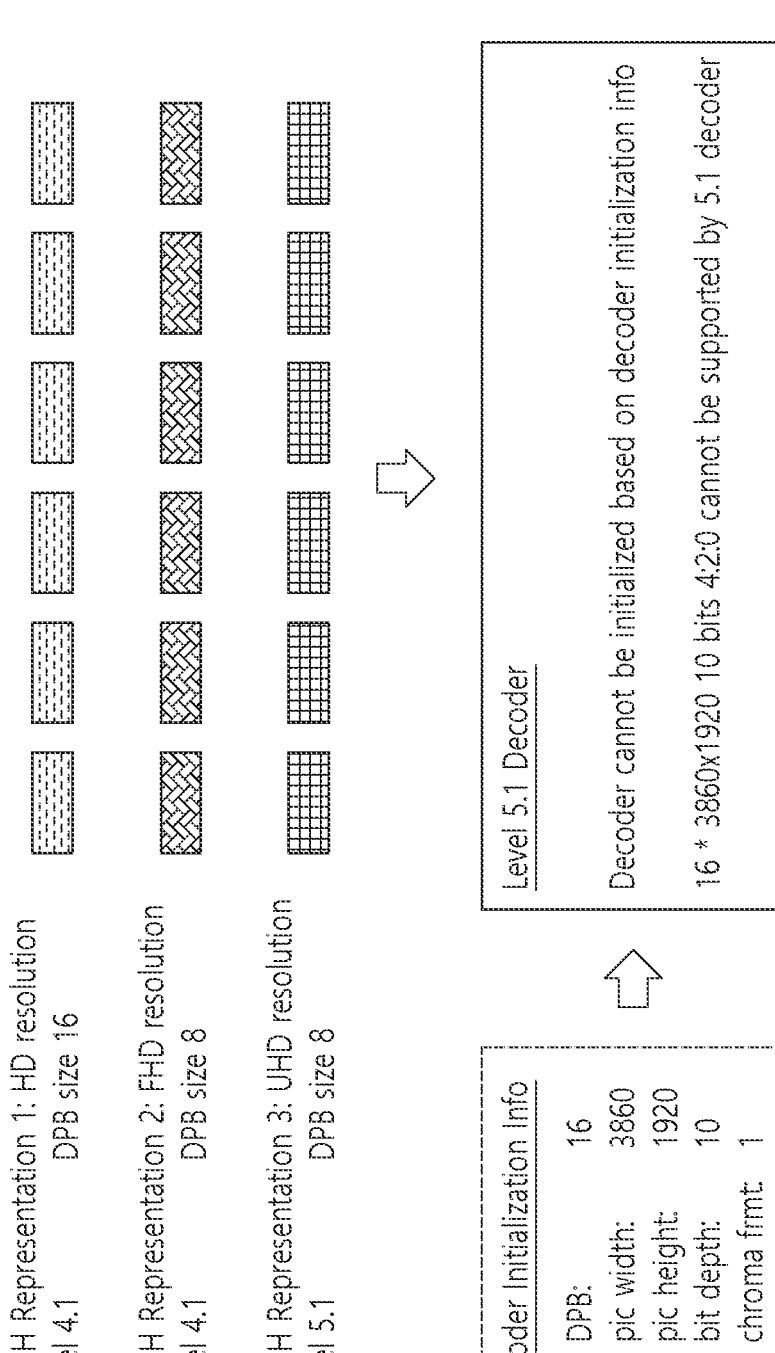

DASH Representation 1: HD resolution
Level 4.1       DPB size 16

DASH Representation 2: FHD resolution
Level 4.1       DPB size 8

DASH Representation 3: UHD resolution
Level 5.1       DPB size 8

Decoder Initialization Info

Max DPB:       16
Max pic width:       3860
Max pic height:       1920
Max bit depth:       10
Max chroma frmt:       1

Level 5.1 Decoder

Decoder cannot be initialized based on decoder initialization info

16 * 3860x1920 10 bits 4:2:0 cannot be supported by 5.1 decoder

Obtain information related to decoder
initialization from bitstream — S810

Perform initializing decoder
based on the information
related to the decoder initialization — S820

Perform decoding — S830

1

METHOD FOR IMAGE CODING BASED ON SIGNALING OF INFORMATION RELATED TO DECODER INITIALIZATION

CROSS-REFERENCE TO RELATED APPLICATIONS

This application is a National Stage application under 35 U.S.C. § 371 of International Application No. PCT/KR2022/005277, filed on Apr. 12, 2022, which claims the benefit of U.S. Provisional Application No. 63/174,023, filed on Apr. 12, 2021. The disclosures of the prior applications are incorporated by reference in their entirety.

BACKGROUND OF THE DISCLOSURE

Field of the Disclosure

The present document relates to image coding technology, and more particularly, to an image coding method based on signaling of information related to decoder initialization.

Related Art

The demands for high-resolution and high-quality video/images, such as an 4K or 8K or higher UHD (ultra-high definition) video/image are recently increasing in various fields. As video/image data become high resolution and high quality, the amount of information or the number of bits that is relatively transmitted is increased compared to the existing video/image data. Accordingly, if image data is transmitted using a medium, such as the existing wired or wireless wideband line, or video/image data are stored using the existing storage medium, transmission costs and storage costs are increased.

In addition, recently, interest and demand for immersive media such as VR (Virtual Reality) and AR (Artificial Reality) contents and holograms are increasing, and broadcasting of video/images having image characteristics different from real images, such as game images, is increasing.

Accordingly, a highly efficient video/image compression technology is required to effectively compress, transmit, store, and playback high-resolution and high-quality video/image information having various characteristics as described above.

SUMMARY OF THE DISCLOSURE

Technical Solutions

According to an embodiment of the present document, provided herein are a method and apparatus for signaling information related to decoder initialization.

According to an embodiment of the present document, provided herein are a method and apparatus for initializing a decoder based on information related to decoder initialization.

According to one embodiment of the present document, provided herein is a video/image decoding method performed by a decoding apparatus.

According to an embodiment of the present document, provided herein is a decoding apparatus for performing video/image decoding.

According to one embodiment of the present document, provided herein is a video/image encoding method performed by an encoding apparatus.

According to an embodiment of the present document, provided herein is an encoding apparatus for performing video/image encoding.

According to one embodiment of the present document, provided herein is a computer-readable digital storage medium in which a bitstream generated according to a video/image encoding method disclosed in at least one of the embodiments of the present document is.

According to one embodiment of the present document, provided herein is a computer-readable digital storage medium in which a bitstream causing a decoding apparatus to perform a video/image decoding method disclosed in at least one of the embodiments of the present document is stored.

Effects of the Disclosure

According to an embodiment of the present document, information related to decoder initialization may be signaled.

According to an embodiment of the present document, a decoder may be initialized based on information related to decoder initialization.

BRIEF DESCRIPTION OF THE DRAWINGS

FIG. 2 is a diagram schematically illustrating the configuration of a video/video encoding apparatus to which the present disclosure may be applied.

FIG. 5 and FIG. 6 are diagrams for describing problems of the previous initialization method.

DESCRIPTION OF EXEMPLARY EMBODIMENTS

Figure 1:
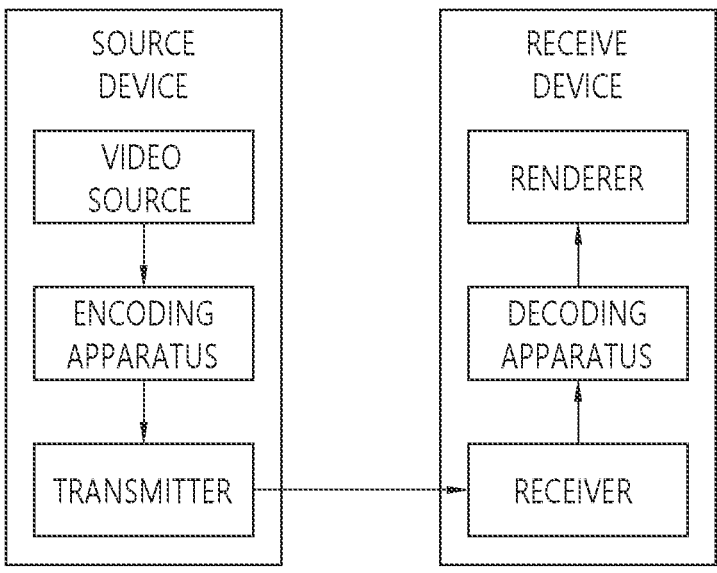
FIG. 1 schematically shows an example of a video/image coding system to which the present disclosure may be applied.

The present document may be modified in various forms, and specific embodiments thereof will be described and shown in the drawings. However, the embodiments are not intended for limiting the present document. The terms used in the following description are used to merely describe specific embodiments, but are not intended to limit the present document. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each configuration in the drawings described in the present document is shown independently for the convenience of description regarding different characteristic functions, and does not mean that each configuration is implemented as separate hardware or separate software. For example, two or more components among each component may be combined to form one component, or one component may be divided into a plurality of components. An embodiment in which elements are combined and/or separated is also included in the scope of rights of this document unless it deviates from the essence of this document.

In the present disclosure, the term "A or B" may mean "only A", "only B", or "both A and B". In other words, in the present disclosure, the term "A or B" may be interpreted to indicate "A and/or B". For example, in the present disclosure, the term "A, B or C" may mean "only A", "only B", "only C", or "any combination of A, B and C".

A slash "/" or a comma used in the present disclosure may mean "and/or". For example, "A/B" may mean "A and/or B". Accordingly, "A/B" may mean "only A", "only B", or "both A and B". For example, "A, B. C" may mean "A, B or C".

In the present disclosure, "at least one of A and B" may mean "only A", "only B", or "both A and B". Further, in the present disclosure, the expression "at least one of A or B" or "at least one of A and/or B" may be interpreted the same as "at least one of A and B".

Further, in the present disclosure. "at least one of A, B and C" may mean "only A", "only B", "only C", or "any combination of A, B and C". Further, "at least one of A. B or C" or "at least one of A, B and/or C" may mean "at least one of A, B and C".

Further, the parentheses used in the present disclosure may mean "for example". Specifically, in the case that "prediction (intra prediction)" is expressed, it may be indicated that "intra prediction" is proposed as an example of "prediction". In other words, the term "prediction" in the present disclosure is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

Technical features that are individually described in a diagram of the present specification may be implemented individually, or may be implemented simultaneously.

Hereinafter, a preferred embodiment of the present disclosure will be described in more detail with reference to the appended drawings. Hereinafter, same reference numerals will be used for indicating the same configuration elements within the drawings, and overlapping (or repetitive) description of the same configuration element(s) will be omitted for simplicity.

FIG. 1 schematically illustrates an example of a video/image coding system to which the present disclosure is applicable.

Referring to FIG. 1, a video/image coding system may include a first device (a source device) and a second device (a reception device). The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present specification relates to video/image coding. For example, the method/example disclosed in the present specification may be applied to a method that is disclosed in a Versatile Video Coding (VVC) standard, an essential video coding (EVC) standard, an AOMedia Video 1 (AV1) standard, a 2nd generation of audio video coding standard (AVS2), or other next-generation video/image coding standard(s) (e.g., H.267 or H.268, and so on).

The present document suggests various embodiments of video/image coding, and the above embodiments may also be performed in combination with each other unless otherwise specified.

In the present document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles.

A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a width specified by syntax elements in the picture parameter set and a height equal to the height of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice may include a plurality of whole (or complete) tiles or a plurality of consecutive (or contiguous) CTU matrices within one tile of a picture that may be included in one NAL unit. In the present specification, a tile group and a slice may be interchangeably used. For example, in the present specification, a tile group/tile group header may be referred to as a slice/slice header.

Meanwhile, one picture may be divided into two or more subpictures. A subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (e.g., cb, cr) blocks. The unit may be used interchangeably with terms such as block or area in some cases. In a general case, an M×N block may include samples (or sample arrays) or a set (or array) of transform coefficients of M columns and N rows.

Figure 2:
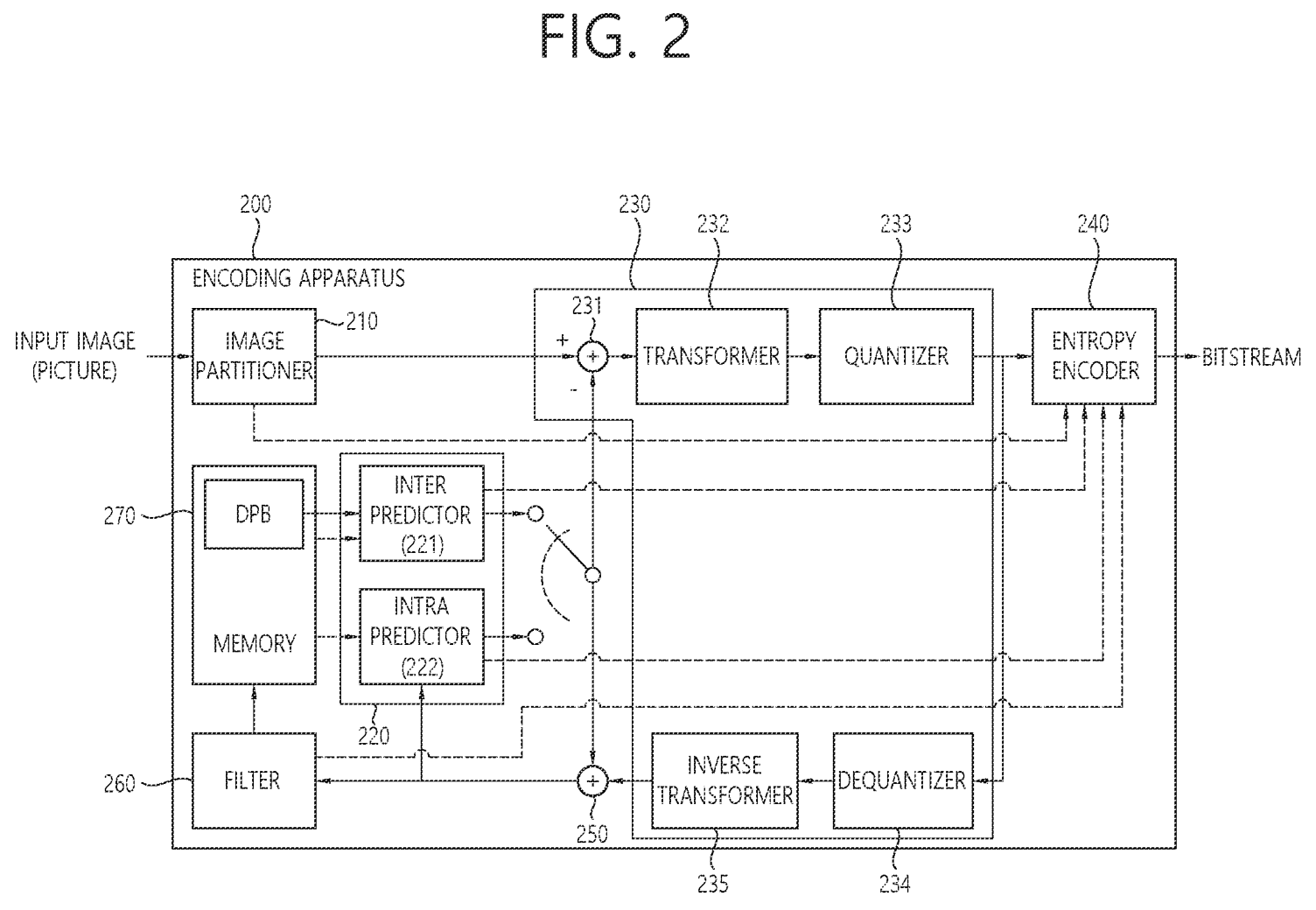

FIG. 2 is a diagram schematically illustrating a configuration of a video/image encoding apparatus to which the present disclosure is applicable. Hereinafter, a video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (e.g., an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a part for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, and so on) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph w % ben relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g., values of syntax elements, and so on) together or separately. Encoded information (e.g., encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage part (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
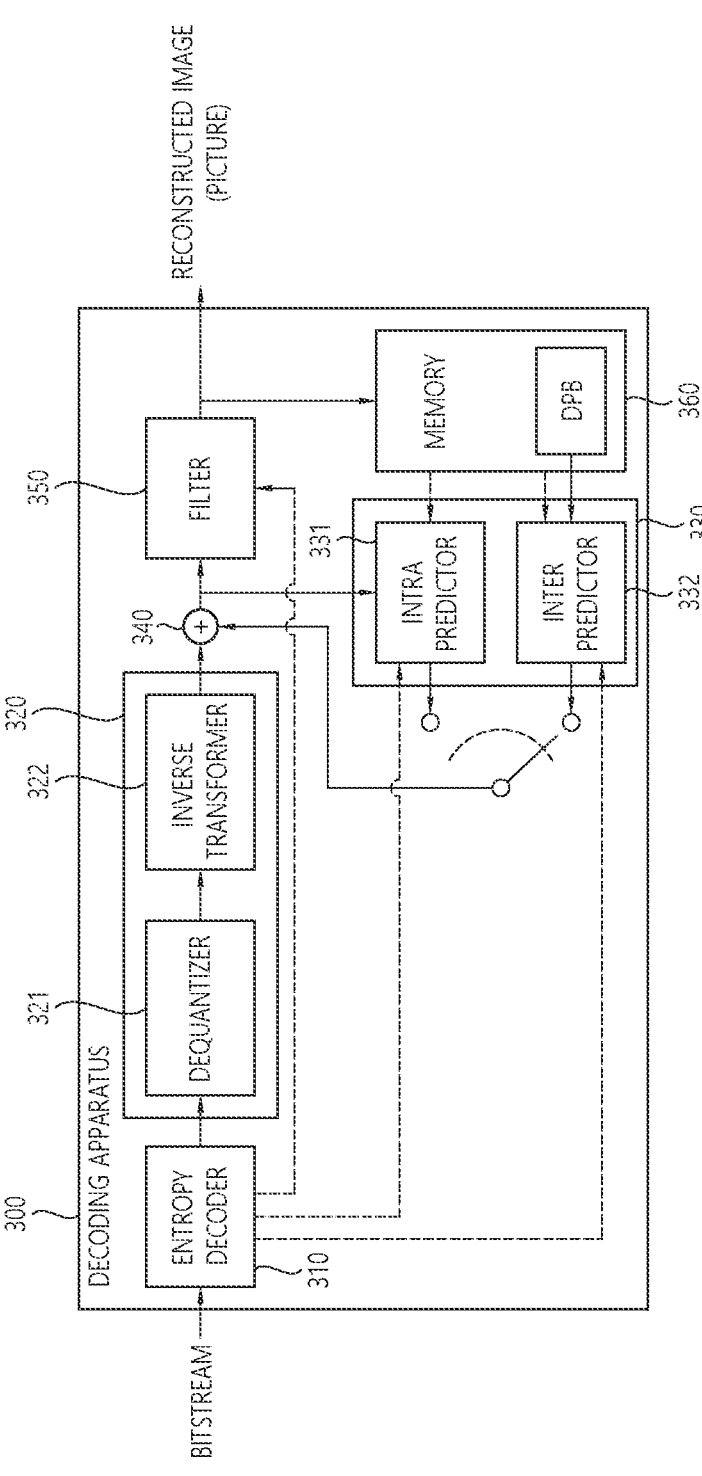
FIG. 3 is a diagram schematically illustrating a configuration of a video/image decoding apparatus to which the present disclosure may be applied.

FIG. 3 is a diagram schematically illustrating a configuration of a video/image decoding apparatus to which the present disclosure is applicable.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (e.g., a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (e.g., quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, and so on) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present document, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the inter predictor 332 and the intra predictor 331.

As described above, in video coding, prediction is performed to increase compression efficiency. Through this, it is possible to generate a predicted block including prediction samples for a current block, which is a block to be coded. Here, the predicted block includes prediction samples in a spatial domain (or pixel domain). The predicted block is derived equally from the encoding apparatus and the decoding apparatus. By signaling, from the encoding apparatus to the decoding apparatus, the information about the residual (residual information) between the original block and the predicted block, rather than signaling a value of original sample of the original block itself, the image coding efficiency may be increased. The decoding apparatus may derive a residual block including residual samples based on the residual information, and generate a reconstructed block including reconstructed samples by summing the residual block and the predicted block, and generate a reconstructed picture including reconstructed blocks.

The residual information may be generated through transformation and quantization processes. For example, the encoding apparatus may derive a residual block between the original block and the predicted block, and perform a transform process on residual samples (residual sample array) included in the residual block to derive transform coefficients, and then, by performing a quantization process on the transform coefficients, derive quantized transform coefficients to signal the residual related information to the decoding apparatus (via a bitstream). Here, the residual information may include location information, a transform technique, a transform kernel, and a quantization parameter, value information of the quantized transform coefficients, and so on. The decoding apparatus may perform dequantization/inverse transformation process based on the residual information and derive residual samples (or residual blocks). The decoding apparatus may generate a reconstructed picture based on the predicted block and the residual block. The encoding apparatus may also dequantize/inverse transform the quantized transform coefficients for reference for inter prediction of a later picture to derive a residual block, and generate a reconstructed picture based thereon. In the present document, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficients may be called coefficients or residual coefficients, or may still be called transform coefficients for uniformity of expression. In the present document, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on an inverse transform (transform) of the scaled transform coefficients. This may be applied/expressed in other parts of the present document as well.

Figure 4:
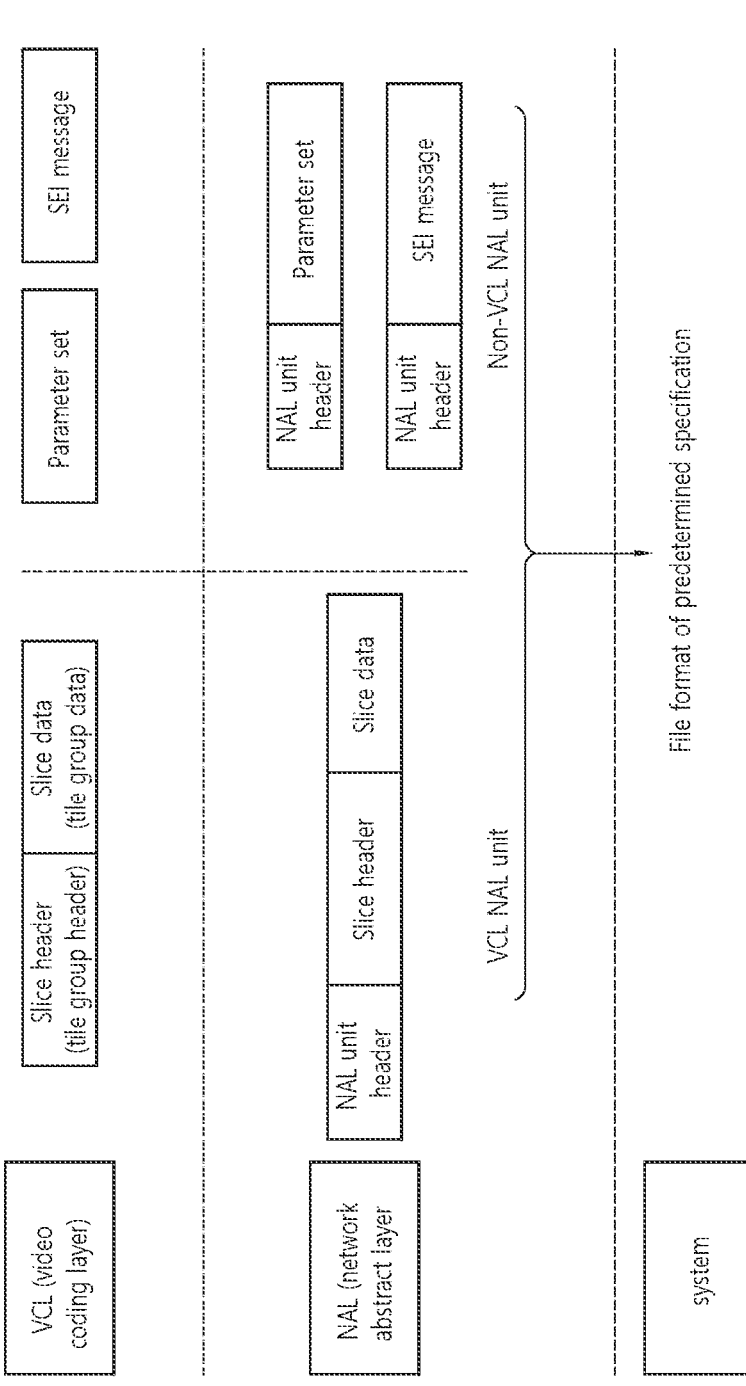
FIG. 4 shows an example of a hierarchical structure for coded video/image.

FIG. 4 exemplarily shows a hierarchical structure for a coded data.

Referring to FIG. 4, the coded data may be divided into a video coding layer (VCL), which handles coding processing of a video/image and the video/image itself, and a Network abstraction layer (NAL), which is exists between the VCL and a sub-system that stores and transmits the coded video/image.

The VCL may generate a parameter set (picture parameter set (PPS), sequence parameter set (SPS), video parameter set (VPS), and so on) corresponding to a header of a sequence and a picture, and so on, and a supplemental enhancement information (SEI) message that is additionally needed in the coding process of the video/image. The SEI message s separated from the information on the video/image (slice data). The VCL including the information on the video/image is configured of slice data and a slice header. Meanwhile, a slice header may be referred to as a tile group header, and slice data may be referred to as tile group data.

In the NAL, a NAL unit may be generated by adding header information (NAL unit header) to a raw byte sequence payload (RBSP) generated in a VCL. In this case, the RBSP refers to slice data, parameter set, SEI message, and so on, generated in the VCL. The NAL unit header may include NAL unit type information specified according to RBSP data included in the corresponding NAL unit.

A NAL unit performs a role of mapping a coded image to bit sequence of a sub-system, such as a file format, Real-time Transport Protocol (RTP), transport stream (TS), and so on.

As shown in the figure, the NAL unit may be classified into a VCL NAL unit and a Non-VCL NAL unit according to the RBSP generated in the VCL. The VCL NAL unit may mean a NAL unit that includes information on the image (slice data) on the image, and the Non-VCL NAL unit may mean a NAL unit that includes information (parameter set or SEI message) required for decoding the image.

The above-described VCL NAL unit and Non-VCL NAL unit may be transmitted through a network by attaching header information according to the data standard of the subsystem. For example, the NAL unit may be transformed into a data format of a predetermined standard such as an H.266/VVC file format, a real-time transport protocol (RTP), a transport stream (TS), and so on, and transmitted through various networks.

As described above, the NAL unit may be specified with the NAL unit type according to the RBSP data structure included in the corresponding NAL unit, and information on the NAL unit type may be stored and signaled in the NAL unit header.

For example, the NAL unit may be classified into a VCL NAL unit type and a Non-VCL NAL unit type according to whether the NAL unit includes information (slice data) about an image. The VCL NAL unit type may be classified according to the nature and type of pictures included in the VCL NAL unit, and the Non-VCL NAL unit type may be classified according to types of parameter sets.

The following is an example of a NAL unit type that is specified in accordance with a parameter set type that is included in a Non-VCL NAL unit type. For example, the NAL unit type may be specified as one of an Adaptation Parameter Set (APS) NAL unit, which is a NAL unit type including APS, a Decoding Parameter Set (DPS) NAL unit, which is a NAL unit type including DPS, a Video Parameter Set (VPS) NAL unit, which is a NAL unit type including VPS, a Sequence Parameter Set (SPS) NAL unit, which is a NAL unit type including SPS, and a Picture Parameter Set (PPS) NAL unit, which is a NAL unit type including PPS.

The aforementioned NAL unit types may have syntax information for the NAL unit type, and the syntax information may be stored and signaled in a NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. The slice header (slice header syntax) may include information/parameters that may be commonly applied to the slice. The APS (APS syntax) or the PPS (PPS syntax) may include information/parameters that may be commonly applied to one or more slices or pictures. The SPS (SPS syntax) may include information/parameters that may be commonly applied to one or more sequences. The VPS (VPS syntax) may include information/parameters that may be commonly applied to multiple layers. The DPS (DPS syntax) may include information/parameters that may be commonly applied to the overall video. The DPS may include information/parameters related to concatenation of a coded video sequence (CVS). The high level syntax (HLS) in the present document may include at least one of the APS syntax, the PPS syntax, the SPS syntax, the VPS syntax, the DPS syntax, and the slice header syntax.

In the present document, the image/image information encoded from the encoding apparatus and signaled to the decoding apparatus in the form of a bitstream includes not only partitioning related information in a picture, intra/inter prediction information, residual information, in-loop filtering information, and so on, but also information included in a slice header, information included in the APS, information included in the PPS, information included in an SPS, information included in the VPS and/or information included in the DPS. In addition, the image/image information may further include NAL unit header information.

Meanwhile, the encoding apparatus may generate decoder initialization information for initializing the decoder and signal the decoder initialization information to the decoding apparatus. The decoding apparatus may initialize a decoder based on the decoder initialization information before performing a decoding process.

Decoder re-initialization may be needed when the streaming client requests to switch to a different bitstream with a different spatial resolution, for adapting to the changing network conditions, e.g., bandwidth. In general, decoder initialization or re-initialization may be performed in 16 MS in a typical case, but may take from 100 to 200 MS depending on various factors of the streaming session. Here, the various factors include memory allocation time, whether the session is secure/non-secure one, mapping time, memory fragmentation of double data rate (DDR)), SMMU internal fragmentation (internal fragmentation of system memory management unit (SMMU)), and the like. Such long time for re-initialization in typical cases may make it difficult to achieve a smooth playback.

Conventionally, there is no information signaled from an encoder/content provider that may help a decoder determine resources need to be allocated to ensure smooth playback. Accordingly, a method of signaling decoder initialization information that can be used by a decoder during a decoder initialization process has been proposed. According to the method, the decoder initialization information provides the maximum memory required to decode a given bitstream, so that decoder can initialize its memory allocation according to this maximum requirement (i.e., max number of picture buffer in DPB, max picture size, max bit depth, and max chroma format). By doing that, it was argued that when the stream changes (e.g., changing of representation in DASH session) there is no need for decoder to invoke re-initialization since the memory initialization/allocation that was done earlier would still be sufficient to handle the new stream/representation. However, the proposed method has at least two problems as described below.

Figure 5:
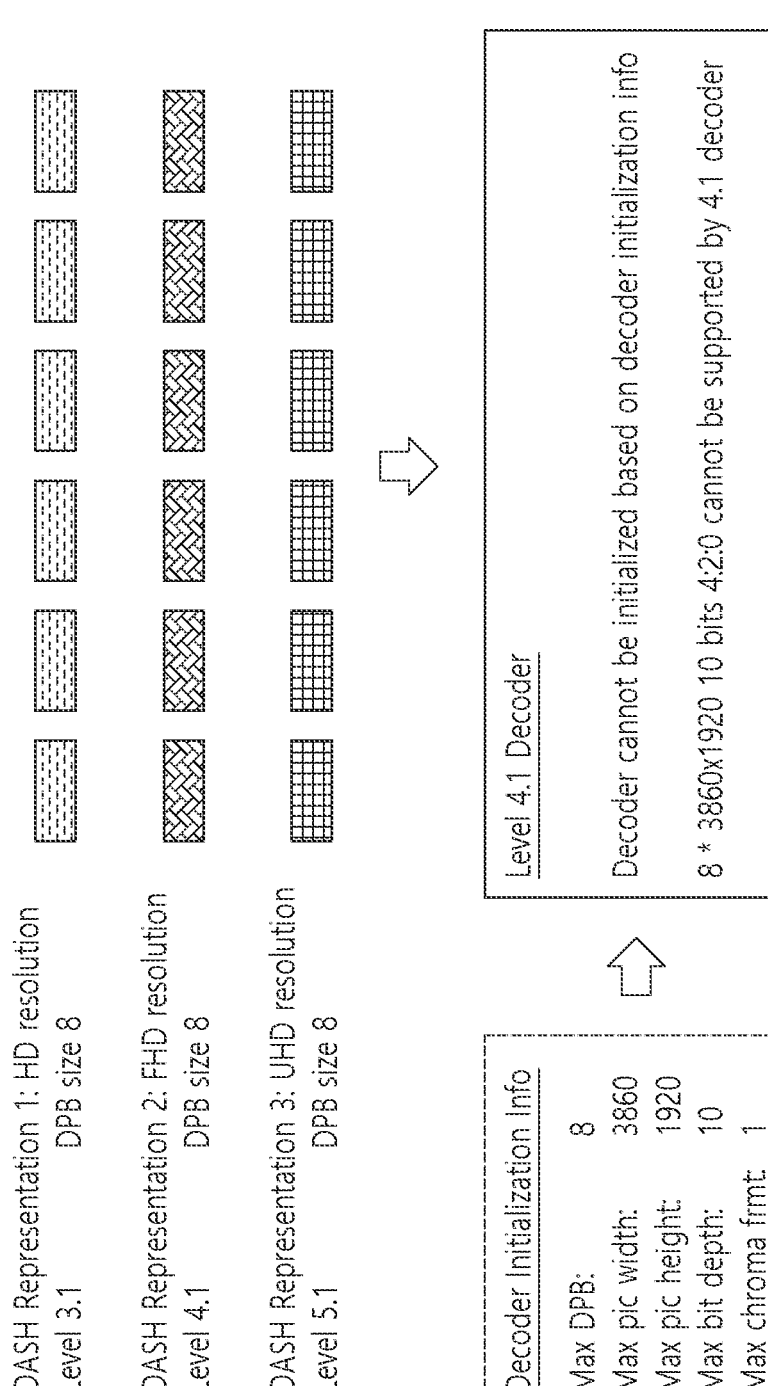

FIG. 5 and FIG. 6 are diagrams for describing problems of the previous initialization method.

Firstly, there is a problem in that the decoder initialization information according to the proposed method above is only useful for decoder that can afford decoding up to the highest representation for the streaming session. That is, there is a problem in that a decoder with less capability (e.g., a level 4.1 decoder) cannot use the information.

Referring to FIG. 5. Given the same content for the streaming session, a level 4.1 decoder can handle the content from the first two representations. However, in this case, it would not be able to take advantage of the decoder initialization information as it is the information about the maximum parameter based on all the representations.

Secondly, there is a problem in that when for each parameter in decoder initialization information only the maximum value is provided, the total memory requirement may exceed what a particular level allowed which consequently makes the information not useful for decoder.

Referring to FIG. 6, instead of having the HD resolution stream to have level 3.1 with DPB size 8, encoder decides to encode the representation with more reference pictures (i.e., needs DPB size of 16) so that the stream is of level 4.1, instead of level 3.1. Such change may affect the maximum DPB in decoder initialization information so that the maximum DPB is 16 instead of 8. Here, a level 5.1 decoder can process the content, but cannot be initialized according to the decoder initialization information because level 5.1 does not support DPB size 16 where each picture buffer can store 3860×1920 10 bits 4:2:0 picture.

The present document proposes the following method to solve the above problem. The methods disclosed in each item may be performed individually or in combinations.

item 1. For a given bitstream, one or more sets of decoder initialization information including the following information may be signaled.

a) level id b) Maximum DPB size required for decoding the associated bitstream/sub-bitstream that conform to the given level id c) Maximum picture size (i.e., picture width and picture height) of the associated bitstream/sub-bitstream that conforms to the given level id to the given level id)

d) Maximum bit-depth of the associated bitstream/sub-bitstream that conform to the given level id e) Maximum chroma format of the associated bitstream/sub-bitstream that conform to the given level id item 2. To support the item 1 above, information that specifies the number of the sets of decoder initialization information may be signaled.

item 3. The total bits signaling one set of decoder initialization information may be a multiplication of 8 bits (i.e., 1 byte). To achieve it, some reserved bits may be added.

item 4. The following constraints may be set for a bitstream related to the sets of the decoder initialization information. For each set of decoder initialization information with a particular level id, the associated bitstream/sub-bitstream that conform to the level id or lower level id (i.e., if the level id is 4.1, the bitstream/sub-bitstream that conforms to level 4.1, 4.0, 3.1, 3.0, or lower) may have DPB size, picture width, picture height, bit-depth, and chroma format that is lower than the maximum DPB size, maximum picture width, maximum picture height, maximum bit-depth, and maximum chroma format, respectively.

Item 5. When decoder initialization information is present, it may further be constrained that the associated bitstream/sub-bitstream has the same profile and tier across its coded video sequences (CVS(s)). That is, the whole bitstream/sub-bitstream may conform to one profile and one tier.

Item 6. When decoder initialization information includes more than one set of information, the order of the sets can be arranged in the descending order of level id. That is, a set corresponds to the higher level id is signaled prior to a set with lower level id.

Item 7. Decoder initialization information may be signaled in an extension to Decoder Parameter Set (i.e., DPS extension). Alternatively, decoder initialization information may be signaled through DCI extension (Decoding Capability Information extension). The above-described DPS extension and DCI extension may be included in high-level syntax.

Item 8. Alternatively, decoder initialization information may be signaled in an SEI message or other parts in the bitstream.

Item 9. In one alternative to item 1, for the signaling of maximum bit-depth, instead of having maximum bit-depth for each set of decoder initialization information, all sets of decoder initialization information may share the same maximum bit-depth.

Item 10. In one alternative to item 1, for the signaling of maximum chroma format, instead of having maximum chroma format for each set of decoder initialization information, all sets of decoder initialization information may share the same maximum chroma format.

Hereinafter, an embodiment to which the methods according to the above items may be applied will be described.

An embodiment according to the present document may be performed based on the syntax structure disclosed in Table 1 below, and Table 2 represents semantics of the syntax elements of Table 1.

TABLE 1

|  | Descriptor |
|---|---|
| dci_extension( ) { | |
|   dci_num_initialization_set_minus1 | u(8) |
|   for( i = 0; i <= dci_num_minialization_set_minus1; i++ ) | |
|     dci_level_idc[ i ] | u(8) |
|     dci_max_num_dec_pics_in_dpb_minus1[ i ] | u(4) |
|     dci_max_bitdepth_minus8[ i ] | u(4) |
|     dci_max_pic_width[ i ] | u(16) |
|     dci_max_pic_height[ i ] | u(16) |
|     dci_max_chroma_format[ i ] | u(2) |
|     dci_ext_reserved_zero_6bits[ i ] | u(6) |
|   } | |
| } | |

TABLE 2

Decoding capability information RBSP semantics

A DCI RBSP could be made available to the decoder, through either being present in the bitstream, included in at least the first AU of the bitstream, or provided through external means.

NOTE 1 -The information contained in the DCI RBSP is not necessary for operation of the decoding process specified in clauses 2 through 9 of this Specification. When present, all DCI NAL units in a bitstream shall have the same content.

...

DCI extension semantics

NOTE-When the dci_extension( ) syntax structure is present for a bitstream and the decoder is intializ ed according to the information associated with one of the initialization set provided in the DCI NA L unit, it is expected that no decoder reinitialization is needed for decoding CVS with general_level_ idc equal to or less than the level associated with the initialization set.

dci_num_initializaon_set_minus1 plus 1 specifies the number of initialization set that are present in th e DCI extension.

dci_level_idc[ i ] specifies the level associated with the i-th initialization set. The value of dci_level_idc [ i ] shall be greater than dci_level_idc[ j ] when i is less than j.

dci_max_num_dec_pics_in_dpb_minus1[ i ] plus 1 specifies the maximum number of decoded pictures n eeded in the DPB at any moment when decoding pictures in the bitstream conforming to the level that is equal to or less than dci_level_idc[ i ].

dci_max_bitdepth_minus8[ i ] plus 8 indicates the maximum bit depth, in units of bits, of each colour component of a decoded picture corresponds to pictures in the bitstream conforming to the level that is equal to or less than dci_level_idc[ i ]. The value of dci_max_bitdepth_minus8[ i ] shall be in the range of 0 to 8, inclusive.

dci_max_pic_width[ i ] specifies the maximum with, in units of luma samples, of a decoded picture co rresponds to pictures in the bitstream conforming to the level that is equal to or less than dci_level_idc [ i ].

dci_max_pic_height[ i ] specifies the maximum height, in units of luma samples, of a decoded picture c orresponds to pictures in the bitstream conforming to the level that is equal to or less than dci_level_id c[ i ].

dci_max_chroma_format[ i ] indicates the maximum value of sps_chroma_format_idc of the SPS referen ced by a picture corresponds to pictures in the bitstream conforming to the level that is equal to or les s than dci_level_idc[ i ].

d c i _ e x t _ r e s e r v e d _ z e r o _ 6 b i t s [ i ] s h a l l b e e q u a l t o 0 in bitstreams conforming to this version of this Specification. The values greater than 0 for dci_ext_reserved_zero _6bits are reserved for future use by ITU-T | ISO/IEC. Decoders shall allow values greater than 0 for dci_ext_ rese rved_zero_6bits[ i ] to appear in the bitstream and shall ignore the value of dci_ext_reserved_zero_6bits [ i ].

Referring to the Tables 1 and 2, information related to decoder initialization may be signaled through Decoding Capability Information (DCI). More specifically, information related to decoder initialization may be signaled through DCI extension. Unlike this, information related to decoder initialization may be signaled through DPS extension or signaled through an SEI message or other part of a bitstream, as described above.

Information related to decoder initialization may be information required to initialize a decoder before starting a decoding process. For example, information related to decoder initialization may be information required to initialize a memory of a decoder before starting a decoding process.

For example, information related to decoder initialization may include one or more sets of decoder initialization information. Information related to decoder initialization may include information about the number of sets of decoder initialization information to represent the number of the one or more sets of decoder initialization information. For example, information about the number of sets of decoder initialization information may be represented by a syntax element dci_num_initialization_set_minus1. The syntax element dci_num_initialization_set_minus1 plus 1 may represent the number of the sets of the decoder initialization information.

For example, each of the one or more sets of decoder initialization information may include level id information and maximum value information of parameters required to decode an associated bitstream/sub-bitstream conforming to a given level id.

For example, the level id information may be represented by a syntax element dci_level_idc[i]. The syntax element dci_level_idc[i] may represent the level (or level id) of the i-th set of the decoder initialization information. The one or more sets of the decoder initialization information may be arranged based on the level id. For example, the order of the sets of the decoder initialization information may be arranged in descending order of level id. That is, a set corresponding to a higher level id may be signaled before a set having a lower level id.

For example, maximum value information on parameters required to decode the associated bitstream/sub-bitstream conforming to the given level id may include maximum DPB size information, maximum picture size information, maximum bit-depth information, and maximum chroma format information.

For example, the maximum DPB size information may represent the maximum DPB size required to decode the associated bitstream/sub-bitstream conforming to the given level id. For example, the maximum DPB size information may be represented by a syntax element dci_max_num_dec_pics_in_dpb_minus1[i]. For example, the syntax element dci_max_num_dec_pics_in_dpb_minus1[i] plus 1 may represent the maximum number of decoded pictures needed in DPB when decoding pictures of a bitstream conforming to a level equal to or less than dci_level_idc[i].

For example, the maximum picture size information may represent the maximum picture size of an associated bitstream/sub-bitstream conforming to a given level id. The maximum picture size information may include maximum picture width information and maximum picture height information.

For example, maximum picture width information may be represented by a syntax element dci_max_pic_width[i]. For example, the syntax element dci_max_pic_width[i] may represent the maximum width, in units of luma samples, of a decoded picture corresponding to a picture in a bitstream conforming to a level equal to or less than dci_level_idc[i].

For example, maximum picture height information may be represented by a syntax element dci_max_pic_height[i]. For example, the syntax element dci_max_pic_height[i] may represent the maximum height, in units of luma samples, of a decoded picture corresponding to a picture in a bitstream conforming to a level equal to or less than dci_level_idc[i].

For example, the maximum bit-depth information may represent the maximum bit-depth of an associated bitstream/sub-bitstream conforming to a given level id. For example, maximum bit-depth information may be represented by a syntax element dci_max_bitdepth_minus8[i]. the syntax element dci_max_bitdepth_minus8[i] plus 8 may represent the maximum bit depth, in units of bits, of each color component of a decoded picture corresponding to a picture in the bitstream conforming to a level equal to or less than dci_level_idc[i].

For example, the maximum chroma format information may represent a maximum chroma format of an associated bitstream/sub-bitstream conforming to a given level id. For example, maximum chroma format information may be represented by a syntax element dci_max_chroma_format[i]. For example, the syntax element dci_max_chroma_format[i] may represent the maximum value of sps_chroma_format_idc of the SPS referenced by a picture corresponds to pictures in the bitstream conforming to the level equal to or less than dci_level_idc[i].

Each of the one or more sets of the decoder initialization information may further include reserved bits information. The information on the reserved bits may be information considering future use by ITU-T|ISO/IEC. Information on reserved bits may be represented by a syntax element dci_ext_reserved_zero_6bits[i].

Meanwhile, another embodiment according to the present document may be performed based on the syntax structure disclosed in Table 3 below, and Table 4 shows semantics of the syntax elements of Table 3.

TABLE 3

|  | Descriptor |
|---|---|
| decoding_init_info( payloadSize ) { |  |
|   dii_num_initialization_set_minus1 |  |
|   for( i = 0; i <= dii_num_initialization_set_minus1; i++ ) | u(8) |
|     dii_level_idc[ i ] | u(8) |
|     dii_max_num_der_pics_in_dpb_minus1[ i ] | u(4) |
|     dii_max_bitdepth_minus8[ i ] | u(4) |
|     dii_max_pic_width[ i ] | u(16) |
|     dii_max_pic_height[ i ] | u(16) |
|     dii_max_chroma_format[ i ] | u(2) |
|     dci_ext_reserved_zero_6bits[ i ] | u(6) |
|   } |  |
| } |  |

TABLE 4

Decoding initialization Information SEI message semantics

When associated with an AU, the decoder initialization information (DII) SEI message provides informat
ion that applies to the entire bitstream. A DII SEI message could be made available to the decoder, thr
ough either being present in the bitstream, included in at least the first AU of the bitstream, or provide
d through external means.

When present, all DII SEI messasages in a bitstream shall have the same payload content.

When any two CVSs in the bistream are indicated to conform to different profiles, there shall be no DI
I SEI message associated with an AU of the bitstream.

NOTE - When the DII SEI message associated with an AU of a bitstream and the decoder may be intializ
    ed according to the profile and one of the initialization information set provided in the DII SEI mes
    sage, it is expected that no decoder reinitialization is needed for decoding the CVS within the bitstre
    am with level that is equal to or less than the level associated with the initialization information set
    that is used.

dii_num_initialization_set_minus1 plus 1 specifies the number of initialization set that are present in th
e SEI message.

dii_max_level_idc[ i ] specifies the level associated with the i-th initialization set. The value of dci_level
_idc[ i ] shall be greater than dci_level_idc[ j ] when i is less than j.

dii_max_num_dec_pics_in_dpb_minus1[ i ] plus 1 specifies the maximum number of decoded pictures n
eeded in the DPB at any moment when decoding pictures in the bitstream conforming to the level that
is equal. to or less than dii_level_idc[ i ].

dii_max_bitdepth_minus8[ i ] plus 8 indicates the maximum bit depth, in units of bits, of each colour c
    omponent of a decoded picture corresponds to pictures in the bitstream conforming to the level that is e
    qual to or less than dii_level_idc[ i ]. The value of dci_max_bitdepth_minus8[ i ] shall be in the range o
    f 0 to 8, inclusive.

dii_max pic_width[ i ] specifies the maximum width, in units of luma samples, of a decoded picture cor
    responds to pictures in the bitstream conforming to the level that is equal to or less than dii_level_idc
    [ i ].

dii_max_pic_height[ i ] specifies the maximum height, in units of luma samples, of a decoded picture c
    orresponds to pictures in the bitstream conforming to the level that is equal. to or less than dii_level_id
    c[ i ].

dii_max_chroma_format[ i ] indicates the maximum value of sps_chroma_format_idc of the SPS referenc
    ed by a picture corresponds to pictures in the bitstream conforming to the level that is equal. to or less
    than dci_level_iic[ i ].

dii_ext_reserved_zero_6bits[ i ]shall be equal to 0
    in bitstreams conforming to this version of this Specification. The values greater than 0 for dci_ext_reserved_zero
    _6bits are reserved for future use by ITU-T | ISO/IEC. Decoders shall allow values greater than 0 for dii_ext_rese
    rved_zero_6bits[ i ] to appear in the bitstream and shall ignore the value of dii_ext_reserved_zero_6bits
    [ i ].

Referring to the Tables 3 and 4, information related to decoder initialization may be signaled through an SEI message. More specifically, information related to decoder initialization may be signaled through a DII SEI message (Decoder initialization information SEI message). Unlike this, information related to decoder initialization may be signaled through DPS extension or signaled through DCI extension or other parts of the bitstream as described above.

Information related to decoder initialization may be information needed to initialize a decoder before starting a decoding process. For example, information related to decoder initialization may be information needed to initialize a memory of a decoder before starting a decoding process.

For example, information related to decoder initialization may include one or more sets of decoder initialization information. Information related to decoder initialization may include information about the number of sets of decoder initialization information to represent the number of the one or more sets of decoder initialization information. For example, information about the number of sets of decoder initialization information may be represented by a syntax element dii_num_initialization_set_minus1. The syntax element dii_num_initialization_set_minus1 plus 1 may represent the number of the sets of the decoder initialization information.

For example, each of the one or more sets of decoder initialization information may include level id information and maximum value information of parameters required to decode an associated bitstream/sub-bitstream conforming to a given level id.

For example, the level id information may be represented by a syntax element dii_level_idc[i]. The syntax element dii_level_idc[i] may represent the level (or level id) of the i-th set of the decoder initialization information. The one or more sets of the decoder initialization information may be arranged based on the level id. For example, the order of the sets of the decoder initialization information may be arranged in descending order of level id. That is, a set corresponding to a higher level id may be signaled before a set having a lower level id.

For example, maximum value information on parameters required to decode the associated bitstream/sub-bitstream conforming to the given level id may include maximum DPB size information, maximum picture size information, maximum bit-depth information, and maximum chroma format information.

For example, the maximum DPB size information may represent the maximum DPB size required to decode the associated bitstream/sub-bitstream conforming to the given level id. For example, the maximum DPB size information may be represented by a syntax element dii_max_num_dec_pics_in_dpb_minus1[i]. For example, the syntax element dii_max_num_dec_pics_in_dpb_minus1[i] plus 1 may represent the maximum number of decoded pictures needed in DPB when decoding pictures of a bitstream conforming to a level equal to or less than dii_level_idc[i].

For example, the maximum picture size information may represent the maximum picture size of an associated bitstream/sub-bitstream conforming to a given level id. The maximum picture size information may include maximum picture width information and maximum picture height information.

For example, maximum picture width information may be represented by a syntax element dii_max_pic_width[i]. For example, the syntax element dii_max_pic_width[i] may represent the maximum width, in units of luma samples, of a decoded picture corresponding to a picture in a bitstream conforming to a level equal to or less than dii_level_idc[i].

For example, maximum picture height information may be represented by a syntax element dii_max_pic_height[i]. For example, the syntax element dii_max_pic_height[i] may represent the maximum height, in units of luma samples, of a decoded picture corresponding to a picture in a bitstream conforming to a level equal to or less than dii_level_idc[i].

For example, the maximum bit-depth information may represent the maximum bit-depth of an associated bitstream/sub-bitstream conforming to a given level id. For example, maximum bit-depth information may be represented by a syntax element dii_max_bitdepth_minus8[i]. the syntax element dii_max_bitdepth_minus8[i] plus 8 may represent the maximum bit depth, in units of bits, of each color component of a decoded picture corresponding to a picture in the bitstream conforming to a level equal to or less than dii_level_idc[i].

For example, the maximum chroma format information may represent a maximum chroma format of an associated bitstream/sub-bitstream conforming to a given level id. For example, maximum chroma format information may be represented by a syntax element dii_max_chroma_format[i]. For example, the syntax element dii_max_chroma_format[i] may represent the maximum value of sps_chroma_ format_idc of the SPS referenced by a picture corresponds to pictures in the bitstream conforming to the level equal to or less than dii_level_idc[i].

Each of the one or more sets of the decoder initialization information may further include information on reserved bits. The information on the reserved bits may be information considering future use by ITU-T|ISO/IEC. Information on reserved bits may be represented by a syntax element dii_ext_reserved_zero_6bits[i].

Meanwhile, another embodiment according to the present document may be performed based on the syntax structure disclosed in Table 5 below, and Table 6 shows semantics of the syntax elements of Table 5.

TABLE 5

|  | Descriptor |
|---|---|
| dci_extention( ) { |  |
| dci_max_bitdepth_minus8 | u(4) |
| dci_max_chroma_format | u(2) |
| dci_ext_reserved_zero_2bits[ i ] | u(2) |
| dci_num_initialization_set_minus1 | u(8) |
| for( i = 0, i <= dci_num_initialization_set_minus1; i++ ) |  |
| dci_level_idc[ i ] | u(8) |
| dci_max_num_dec_pics_in_dpb_minus1[ i ] | u(4) |
| dci_ext_reserved_zero_4bits[ i ] | u(4) |
| dci_max_pic_width[ i ] | u(16) |
| dci_max_pic_height[ i ] | u(16) |
| } |  |
| } |  |

TABLE 6

Decoding capability information RBSP semantics

A DCI RBSP could be made available to the decoder, through either being present in the bitstream, included in at least the first AU of the bitstream, or provided through external means.

NOTE 1 - The information contained in the DCI RBSP is not necessary for operation of the decoding process specified in clauses 2 through 9 of this Specification. When present, all DCI NAL units in a bitstream shall have the same content

...

DCI extension semantics

NOTE - When the dci_extension( ) syntax structure is present for a bitstream and the decoder is intializ ed according to the information associated with one of the initialization set provided in the DCI NA L unit, it is expected that no decoder reinitialization is needed for decoding CVS with general_level_ idc equal to or less than the level associated with the initialization set.

dci_max_bitdepth_minus8 plus 8 indicates the maximum bit depth, in units of bits, of each colour com ponent of a decoded picture in the bitstream. The value of dci_max_bitdepth_minus8[ i ] shall be in the range of 0 to 8, inclusive.

dci_max_chroma_format indicates the maximum value of sps_chroma_format_idc of the SPS referenced by a picture corresponds to pictures in the bitstream.

dci_ext_reserved_zero_2bits[ i ]shall be equal to 0 in bitstreams conforming to this version of this Specification. The values greater than 0 for dci_ext_reserved_zero _2bits are reserved for future use by ITU-T | ISO/IEC. Decoders shall allow values greater than 0 for dci_ext_rese rved_zero_2bits[ i ] to appear in the bitstream and shall ignore the value of dci_ext_reserved_zero_2bits [ i ].

dci_num_initialization_set_minus1 plus 1 specifies the number of initialization set that are present in th e DCI extension.

dci_level_idc[ i ] specifies the level associated with the i-th initialization set. The value of dci_level_ide [ i ] shall be greater than dci_level_idc[ j ] when i is less than j.

dci_max_num_dec_pics_in_dpb_minus1[ i ] plus 1 specifies the maximum number of decoded pictures n eeded in the DPB at any moment when decoding pictures in the bitstream conforming to the level that is equal. to or less than dci_level_idc[ i ].

dci_ext_reserved_zero_4bits[ i ]shall be equal to 0. in bitstreams conforming to this version of this Specification. The values greater than 0 for dci_ext_reserved _4bits are reserved for future use by ITU-T | ISO/IEC. Decoders shall allow values greater than 0 for dci_ext_ rese rved_zero_4bits[ i ] to appear in the bitstream and shall ignore the value of dci_ext_reserved_zero_4bits [ i ].

dci_max_pic_width[ i ] specifies the maximum width, in units of luma samples, of a decoded picture co rresponds to pictures in the bitstream conforming to the level that is equal to or less than dci_level_idc [ i ].

dci_max_pic_height[ i ] specifies the maximum height, in units of luma samples, of a decoded picture c orresponds to pictures in the bitstream conforming to the level that is equal to or less than dci_level_id c[ i ].

Referring to the Tables 5 and 6, information related to decoder initialization may be signaled through Decoding Capability Information (DCI). More specifically, information related to decoder initialization may be signaled through DCI extension. Unlike this, information related to decoder initialization may be signaled through DPS extension or signaled through an SEI message or other part of a bitstream, as described above.

Information related to decoder initialization may be information needed to initialize a decoder before starting a decoding process. For example, information related to decoder initialization may be information needed to initialize a memory of a decoder before starting a decoding process.

Meanwhile, according to an embodiment disclosed in Table 5, unlike the embodiment described through Tables 1 and 2, maximum bit-depth information and maximum chroma format information may be shared by one or more sets of the decoder initialization information. In other words, the maximum bit-depth information and the maximum chroma format information may be signaled as information that can be shared by the one or more sets of decoder initialization information, rather than being signaled by being included in each of one or more sets of decoder initialization information. When the sets of the decoder initialization information share the maximum bit-depth information and the maximum chroma format information, the number of bits is reduced compared to the case where each of the sets of the decoder initialization information includes the maximum bit-depth information and the maximum chroma format information.

For example, information related to decoder initialization may include maximum bit-depth information, maximum chroma format information, first information on reserved bits, and information about the number of sets of decoder initialization information.

For example, the maximum bit-depth information may represent the maximum bit-depth shared by all sets of the decoder initialization information. In other words, all sets of the decoder initialization information may have the same maximum bit depth. For example, maximum bit-depth information may be represented by a syntax element dci_max_bitdepth_minus8. For example, the syntax element dci_max_bitdepth_minus8 plus 8 may represent the maximum bit depth of each color component of a decoded picture in units of bits.

For example, the maximum chroma format information may represent a maximum chroma format shared by all sets of the decoder initialization information. In other words, all sets of the decoder initialization information may have the same maximum chroma format. For example, maximum chroma format information may be represented by a syntax element dci_max_chroma_format. For example, the syntax element dci_max_chroma_format may represent the maximum value of sps_chroma_format_idc of the SPS referenced by a picture corresponds to pictures in the bitstream.

The first information on the reserved bits may be information considering future use by ITU-TI ISO/IEC. The first information on the reserved bits may be represented by a syntax element dci_ext_reserved_zero_2bits[i]. Unlike the information on the reserved bits disclosed in the Tables 1 to 4 above, the first information on the reserved bits may not be information included in a set of the decoder initialization information. That is, the first information on the reserved bits may be information signaled before each decoder initialization information set is signaled.

For example, information about the number of sets of decoder initialization information may represent the number of one or more sets of the decoder initialization information. For example, information about the number of the sets of the decoder initialization information may be represented by a syntax element dci_num_initialization_set_minus1. The syntax element dci_num_initialization_set_minus1 plus 1 may represent the number of the sets of the decoder initialization information.

After the aforementioned maximum bit-depth information, maximum chroma format information, the first information on the reserved bits, and the information about the number of the sets of the decoder initialization information are signaled, one or more sets of the decoder initialization information may be signaled.

For example, each of the one or more sets of decoder initialization information may include level id information and maximum value information of parameters required to decode an associated bitstream/sub-bitstream conforming to a given level id.

For example, the level id information may be represented by a syntax element dci_level_idc[i]. The syntax element dci_level_idc[i] may represent the level (or level id) of the i-th set of the decoder initialization information. The one or more sets of the decoder initialization information may be arranged based on the level id. For example, the order of the sets of the decoder initialization information may be arranged in descending order of level id. That is, a set corresponding to a higher level id may be signaled before a set having a lower level id.

For example, maximum value information on parameters required to decode the associated bitstream/sub-bitstream conforming to the given level id may include maximum DPB size information and maximum picture size information. According to an embodiment according to the Table 5, unlike the embodiments according to the Tables 1 to 4, maximum bit-depth information and maximum chroma format information may not be included in a set of the decoder initialization information. Because as described above, according to an embodiment according to the Table 5, all sets of the decoder initialization information share maximum bit-depth information and maximum chroma format information. When the sets of the decoder initialization information share the maximum bit-depth information and the maximum chroma format information, the number of bits is reduced compared to the case where each of the sets of the decoder initialization information includes the maximum bit-depth information and the maximum chroma format information.

For example, the maximum DPB size information may represent the maximum DPB size required to decode the associated bitstream/sub-bitstream conforming to the given level id. For example, the maximum DPB size information may be represented by a syntax element dci_max_num_dec_pics_in_dpb_minus1[i]. For example, the syntax element dci_max_num_dec_pics_in_dpb_minus1[i] plus 1 may represent the maximum number of decoded pictures needed in DPB when decoding pictures of a bitstream conforming to a level equal to or less than dci_level_idc[i].

For example, the maximum picture size information may represent the maximum picture size of an associated bitstream/sub-bitstream conforming to a given level id. The maximum picture size information may include maximum picture width information and maximum picture height information.

For example, maximum picture width information may be represented by a syntax element dci_max_pic_width[i]. For example, the syntax element dci_max_pic_width[i] may represent the maximum width, in units of luma samples, of a decoded picture corresponding to a picture in a bitstream conforming to a level equal to or less than dci_level_idc[i].

For example, maximum picture height information may be represented by a syntax element dci_max_pic_height[i]. For example, the syntax element dci_max_pic_height[i] may represent the maximum height, in units of luma samples, of a decoded picture corresponding to a picture in a bitstream conforming to a level equal to or less than dci_level_idc[i].

Each of the one or more sets of the decoder initialization information may further includes second information on reserved bits. The second information on the reserved bits may be information considering future use by ITU-T|ISO/IEC. The second information on the reserved bits may be represented by a syntax element dci_ext_reserved_zero_4bits[i]. Unlike the above-described the first information on the reserved bits, the second information on the reserved bits may be information included in each set of decoder initialization information.

Meanwhile, another embodiment according to the present document may be performed based on the syntax structure disclosed in Table 7 below, and Table 8 shows semantics of the syntax elements of Table 7.

TABLE 7

| | Descriptor |
|---|---|
| decoding_init_info( payloadSize ) { | |
| dii_max_bitdepth_minus8[ i ] | u(4) |
| dii_max_chroma_format[ i ] | u(2) |
| dci_ext_reserved_zero_2bits[ i ] | u(2) |
| dii_num_initialization_set_minus1 | u(8) |
| for( i = 0; i <= dii_num_initialization_set_minus1; i++ ) | |
| dii_level_idc[ i ] | u(8) |
| dii_max_num_dec_pics_in_dpb_minus1[ i ] | u(4) |
| dci_ext_reserved_zero_4bits[ i ] | u(4) |
| dii_max_pic_width[ i ] | u(16) |
| dii_max_pic_height[ i ] | u(16) |
| } | |
| } | |

TABLE 8

Decoding initialization information SEI message semantics

When associated with an AU, the decoder initialization information (DII) SEI message provides informat ion that applies to the entire bitstream. A DII SEI message could be made available to the decoder, thr ough either being present in the bitstream, included in at least the first AU of the bitstream, or provide d through external means.

When present, all DII SEI messages in a bitstream shall have the same payload content.

When any two CVSs in the bistream are indicated to conform to different profiles, there shall be no DI I SEI message associated with an AU of the bitstream.

NOTE - When the DII SEI message associated with an AU of a bitstream and the decoder may be intializ ed according to the profile and one of the initialization information set provided in the DII SEI mes sage, it is expected that no decoder reinitialization is needed for decoding the CVS within the bitstre am with level that is equal to or less than the level associated with the initialization information set that is used.

dii_max_bitdepth_minus8 plus 8 indicates the maximum bit depth, in units of bits, of each colour com ponent of a decoded picture corresponds to pictures in the bitstream. The value of dci_max_bitdepth_mi nus8[ i ] shall be in the range of 0 to 8, inclusive.

dii_max_chroma_format indicates the maximum value of sps_chroma_format_ide of the SPS referenced by a picture corresponds to pictures in the bitstream.

dii_ext_reserved_zero_2bits[ i ] shall be equal to 0 in bitstreams conforming to this version of this Specification. The values greater than 0 for dci_ext_reserved_zero _2bits are reserved for future use by ITU-T | ISO/IEC. Decoders shall allow values greater than 0 for dii_ext_rese rved_zero_2bits[ i ] to appear in the bitstream and shall ignore the value of dii_ext_reserved_zero_2bits [ i ].

dii_num_initialization_set_minus1 plus 1 specifies the number of initialization set that are present in th e SEI message.

dii_max_level_idc[ i ] specifies the level associated with the i-th initialization set. The value of dci_level _idc[ i ] shall be greater than dci_level_idc[ j ] when i is less than j.

dii_max_num_dec_pics_in_dpb_minus1[ i ] plus 1 specifies the maximum number of decoded pictures n eeded in the DPB at any moment when decoding pictures in the bitstream conforming to the level that is equal to or less than dii_level_idc[ i ].

dii_ext_reserved_zero_4bits[ i ] shall be equal to 0 in bitstreams conforming to this version of this Specification. The values greater than 0 for dci_ext_reserved_zero _4bits are reserved for future use by ITU-T | ISO/IEC. Decoders shall allow values greater than 0 for dii_ext_rese rved_zero_4bits[ i ] to appear in the bitstream and shall ignore the value of dii_ext_reserved_zero_4bits [ i ].

dii_max_pic_width[ i ] specifies the maximum width, in units of luma samples, of a decoded picture cor responds to pictures in the bitstream conforming to the level that is equal to or less than dii_level_idc [ i ].

dii_max_pic_height[ i ] specifies the maximum height, in units of luma samples, of a decoded picture c orresponds to pictures in the bitstream conforming to the level that is equal to or less than dii_level_id c[ i ].

Referring to the Tables 7 and 8, information related to decoder initialization may be signaled through an SEI message. More specifically, information related to decoder initialization may be signaled through a DII SEI message (Decoder initialization information SEI message). Unlike this, information related to decoder initialization may be signaled through DPS extension or signaled through DCI extension or other parts of the bitstream as described above.

Information related to decoder initialization may be information needed to initialize a decoder before starting a decoding process. For example, information related to decoder initialization may be information needed to initialize a memory of a decoder before starting a decoding process.

Meanwhile, according to an embodiment disclosed in Table 7, unlike the embodiment described through Tables 4 and 5, maximum bit-depth information and maximum chroma format information may be shared by one or more sets of the decoder initialization information. In other words, the maximum bit-depth information and the maximum chroma format information may be signaled as information that can be shared by the one or more sets of decoder initialization information, rather than being signaled by being included in each of one or more sets of decoder initialization information. When the sets of the decoder initialization information share the maximum bit-depth information and the maximum chroma format information, the number of bits is reduced compared to the case where each of the sets of the decoder initialization information includes the maximum bit-depth information and the maximum chroma format information.

For example, information related to decoder initialization may include maximum bit-depth information, maximum chroma format information, first information on reserved bits, and information about the number of sets of decoder initialization information.

For example, the maximum bit-depth information may represent the maximum bit-depth shared by all sets of the decoder initialization information. In other words, all sets of the decoder initialization information may have the same maximum bit depth. For example, maximum bit-depth information may be represented by a syntax element dii_max_bitdepth_minus8. For example, the syntax element dii_max_bitdepth_minus8 plus 8 may represent the maximum bit depth of each color component of a decoded picture in units of bits.

For example, the maximum chroma format information may represent a maximum chroma format shared by all sets of the decoder initialization information. In other words, all sets of the decoder initialization information may have the same maximum chroma format. For example, maximum chroma format information may be represented by a syntax element dii_max_chroma_format. For example, the syntax element dii_max_chroma_format may represent the maximum value of sps_chroma_format_idc of the SPS referenced by a picture corresponds to pictures in the bitstream.

The first information on the reserved bits may be information considering future use by ITU-T|ISO/IEC. The first information on the reserved bits may be represented by a syntax element dii_ext_reserved_zero_2bits[i]. Unlike the information on the reserved bits disclosed in the Tables 1 to 4 above, the first information on the reserved bits may not be information included in a set of the decoder initialization information. That is, the first information on the reserved bits may be information signaled before each decoder initialization information set is signaled.

For example, information about the number of sets of decoder initialization information may represent the number of one or more sets of the decoder initialization information. For example, information about the number of the sets of the decoder initialization information may be represented by a syntax element dii_num_initialization_set_minus1. The syntax element dii_num_initialization_set_minus1 plus 1 may represent the number of the sets of the decoder initialization information.

After the aforementioned maximum bit-depth information, maximum chroma format information, the first information on the reserved bits, and the information about the number of the sets of the decoder initialization information are signaled, one or more sets of the decoder initialization information may be signaled.

For example, each of the one or more sets of decoder initialization information may include level id information and maximum value information of parameters required to decode an associated bitstream/sub-bitstream conforming to a given level id.

For example, the level id information may be represented by a syntax element dii_level_idc[i]. The syntax element dii_level_idc[i] may represent the level (or level id) of the i-th set of the decoder initialization information. The one or more sets of the decoder initialization information may be arranged based on the level id. For example, the order of the sets of the decoder initialization information may be arranged in descending order of level id. That is, a set corresponding to a higher level id may be signaled before a set having a lower level id.

For example, maximum value information on parameters required to decode the associated bitstream/sub-bitstream conforming to the given level id may include maximum DPB size information and maximum picture size information. According to an embodiment according to the Table 7, unlike the embodiments according to the Tables 1 to 4, maximum bit-depth information and maximum chroma format information may not be included in a set of the decoder initialization information. Because as described above, according to an embodiment according to the Table 7, all sets of the decoder initialization information share maximum bit-depth information and maximum chroma format information. When the sets of the decoder initialization information share the maximum bit-depth information and the maximum chroma format information, the number of bits is reduced compared to the case where each of the sets of the decoder initialization information includes the maximum bit-depth information and the maximum chroma format information.

For example, the maximum DPB size information may represent the maximum DPB size required to decode the associated bitstream/sub-bitstream conforming to the given level id. For example, the maximum DPB size information may be represented by a syntax element dii_max_num_dec_pics_in_dpb_minus1[i]. For example, the syntax element dii_max_num_dec_pics_in_dpb_minus1[i] plus 1 may represent the maximum number of decoded pictures needed in DPB when decoding pictures of a bitstream conforming to a level equal to or less than dii_level_idc[i].

For example, the maximum picture size information may represent the maximum picture size of an associated bitstream/sub-bitstream conforming to a given level id. The maximum picture size information may include maximum picture width information and maximum picture height information.

For example, maximum picture width information may be represented by a syntax element dii_max_pic_width[i]. For example, the syntax element dii_max_pic_width[i] may represent the maximum width, in units of luma samples, of a decoded picture corresponding to a picture in a bitstream conforming to a level equal to or less than dii_level_idc[i].

For example, maximum picture height information may be represented by a syntax element dii_max_pic_height[i]. For example, the syntax element dii_max_pic_height[i] may represent the maximum height, in units of luma samples, of a decoded picture corresponding to a picture in a bitstream conforming to a level equal to or less than dii_level_idc[i].

Each of the one or more sets of the decoder initialization information may further includes second information on reserved bits. The second information on the reserved bits may be information considering future use by ITU-T∥ISO/IEC. The second information on the reserved bits may be represented by a syntax element dii_ext_reserved_zero_4bits[i]. Unlike the above-described the first information on the reserved bits, the second information on the reserved bits may be information included in each set of decoder initialization information.

Figure 7:
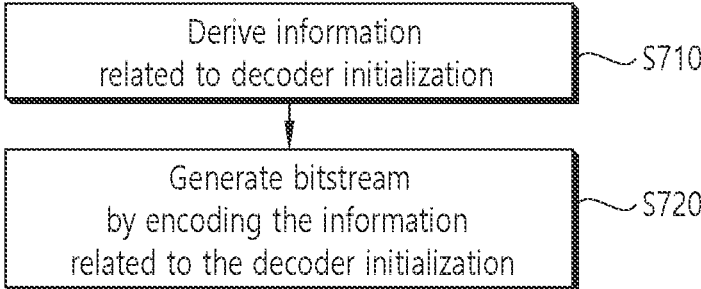
FIG. 7 schematically illustrates an example of a video/image encoding method according to the embodiment(s) of the present document.

FIG. 7 schematically illustrates an example of a video/image encoding method according to the embodiment(s) of the present document.

The method disclosed in FIG. 7 may be performed by the encoding apparatus 200 disclosed in FIG. 2. The method disclosed in FIG. 7 may be performed according to the embodiments described above in this document. Therefore, in FIG. 7, detailed descriptions of contents overlapping with those of the above-described embodiments are omitted or simplified.

Referring to FIG. 7, the encoding apparatus may derive information related to decoder initialization (S700).

In an embodiment, the information related to the decoder initialization may be included in a decoding capability information (DCI) extension syntax structure, a decoder parameter set extension (DPS extension) syntax structure, or a supplemental enhancement information (SEI) message syntax structure. Unlike this, the information related to decoder initialization may be included in another part of the bitstream.

In an embodiment, information related to decoder initialization may include a set of the decoder initialization information. For example, information related to decoder initialization may include one or more sets of decoder initialization information.

In an embodiment, the set of the decoder initialization information may include level id information and maximum value information on parameters for a bitstream related to the level id information. The value of the level id information may specify a level related to a set of the decoder initialization information.

In an embodiment, the set of the decoder initialization information may be arranged based on a descending order of values of the level id information. That is, a set of the decoder initialization information corresponding to a higher level id may be signaled before a set of the decoder initialization information having a lower level id.

In an embodiment, the maximum value information on the parameters may include maximum DPB size information and maximum picture size information. The maximum DPB size information may specify the maximum DPB size for a bitstream conforming to a level equal to or less than the level specified by the level id information. The maximum picture size information may specify the maximum picture size of a picture in a bitstream conforming to a level equal to or less than the level specified by the level id information.

In an embodiment, the maximum value information on the parameters may include maximum bit-depth information and maximum chroma format information. The maximum bit-depth information may specify the maximum bit depth of each color component of a picture in a bitstream conforming to a level equal to or less than the level specified by the level id information. The maximum chroma format information may specify the maximum value of a syntax element sps_chroma_format_idc of a sequence parameter set (SPS) referenced by a picture in a bitstream conforming to a level equal to or less than the level specified by the level id information. The syntax element sps_chroma_format_idc may represent a chroma sampling relative to a luma sampling.

In an embodiment, the bitstream conforming to the level specified by the level id information may have DPB size, picture size, bit-depth, and chroma format that is equal to or smaller than the maximum DPB size, the maximum picture size, the maximum bit-depth, and the maximum chroma format, respectively.

In an embodiment, the set of the decoder initialization information may include information on reserved bits. The information on the reserved bits may be information for representing the set of the decoder initialization information as a multiplication of 8 bits. The information on the reserved bits may be information considering future use by ITU-T∥ISO/IEC.

For example, the set of the decoder initialization information may be represented as a multiplication of 8 bits. Specifically, the total bits for representing the set of the decoder initialization information including information on the maximum DPB size, the maximum picture size, the maximum bit-depth, the maximum chroma format, and the reserved bits are the multiplication of 8 bits.

In an embodiment, the information related to decoder initialization may include information about the number of the sets of the decoder initialization information. The information on the number of the sets of the decoder initialization information may specify the number of the sets of the decoder initialization information included in information related to decoder initialization.

In an embodiment, the information related to decoder initialization may include shared information. For example, the shared information may be information shared by all sets of the decoder initialization information. That is, the information represented by the shared information may not be included in each set of the decoder initialization information.

For example, the shared information may include shared maximum bit depth information and shared maximum chroma format information. The shared maximum bit depth information may specify a common maximum bit depth of each color component of pictures in all sets of the decoder initialization information. When the information related to the decoder initialization includes the shared maximum bit depth information, each set of the decoder initialization information may not include the maximum bit depth information. The shared maximum chroma format information may specify a common maximum value of the syntax element sps_chroma_format_idc of the SPS referenced by pictures in all sets of the decoder initialization information. When the information related to decoder initialization includes the shared maximum chroma format information, each set of the decoder initialization information may not include maximum chroma format information.

In an embodiment, the bitstream may have the same profile and tier across a coded video sequence (CVS). More specifically, if information related to decoder initialization or decoder initialization information is present, the associated bitstream/sub-bitstream may have the same profile and tier across the coded video sequences (CVS(s)). That is, the entire bitstream/sub-bitstream may conform to one profile and one tier.

The encoding apparatus may generate a bitstream by encoding information related to decoder initialization (S710). The generated bitstream may be signaled to a decoding apparatus. In other words, a bitstream including information related to decoder initialization may be signaled to a decoding apparatus, and the decoding apparatus may perform decoder initialization based on information related to decoder initialization, and perform the decoding.

Figure 8:
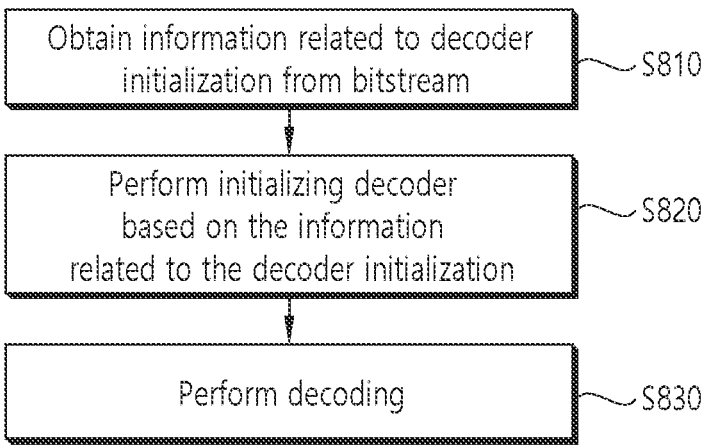
FIG. 8 schematically illustrates an example of a video/image decoding method according to the embodiment(s) of the present document.

FIG. 8 schematically illustrates an example of a video/image decoding method according to the embodiment(s) of the present document.

The method disclosed in FIG. 8 may be performed by the decoding apparatus 300 disclosed in FIG. 3. The method disclosed in FIG. 8 may be performed according to the embodiments described above in this document. Therefore, in FIG. 8, detailed descriptions of overlapping contents with the above-described embodiments will be omitted or simplified.

Referring to FIG. 8, the decoding apparatus may obtain information related to decoder initialization from a bitstream (S800).

In an embodiment, the information related to the decoder initialization may be included in a decoding capability information (DCI) extension syntax structure, a decoder parameter set extension (DPS extension) syntax structure, or a supplemental enhancement information (SEI) message syntax structure. Unlike this, the information related to decoder initialization may be signaled by being included in another part of the bitstream.

In an embodiment, information related to decoder initialization may include a set of the decoder initialization information. For example, information related to decoder initialization may include one or more sets of decoder initialization information.

In an embodiment, the set of the decoder initialization information may include level id information and maximum value information on parameters for decoding a bitstream related to the level id information. The value of the level id information may specify a level related to a set of the decoder initialization information.

In an embodiment, the set of the decoder initialization information may be arranged based on a descending order of values of the level id information. That is, a set of the decoder initialization information corresponding to a higher level id may be signaled before a set of the decoder initialization information having a lower level id.

In an embodiment, the maximum value information on the parameters may include maximum DPB size information and maximum picture size information. The maximum DPB size information may specify a maximum DPB size required to decode a bitstream conforming to a level equal to or smaller than the level specified by the level id information. The maximum picture size information may specify the maximum picture size of a picture in a bitstream conforming to a level equal to or smaller than the level specified by the level id information.

In an embodiment, the maximum value information on the parameters may include maximum bit-depth information and maximum chroma format information. The maximum bit-depth information may specify the maximum bit depth of each color component of a picture in a bitstream conforming to a level equal to or less than the level specified by the level id information. The maximum chroma format information may specify the maximum value of a syntax element sps_chroma_format_idc of a sequence parameter set (SPS) referenced by a picture in a bitstream conforming to a level equal to or less than the level specified by the level id information. The syntax element sps_chroma_format_idc may represent a chroma sampling relative to a luma sampling.

In an embodiment, the bitstream conforming to the level specified by the level id information may have DPB size, picture size, bit-depth, and chroma format that is equal to or smaller than the maximum DPB size, the maximum picture size, the maximum bit-depth, and the maximum chroma format, respectively.

In an embodiment, the set of the decoder initialization information may include information on reserved bits. The information on the reserved bits may be information for representing the set of the decoder initialization information as a multiplication of 8 bits. The information on the reserved bits may be information considering future use by ITU-T|ISO/IEC.

For example, the set of the decoder initialization information may be represented as a multiplication of 8 bits. Specifically, the total bits for representing the set of the decoder initialization information including information on the maximum DPB size, the maximum picture size, the maximum bit-depth, the maximum chroma format, and the reserved bits are the multiplication of 8 bits.

In an embodiment, the information related to decoder initialization may include information about the number of the sets of the decoder initialization information. The information on the number of the sets of the decoder initialization information may specify the number of the sets of the decoder initialization information included in information related to decoder initialization.

In an embodiment, the information related to decoder initialization may include shared information. For example, the shared information may be information shared by all sets of the decoder initialization information. That is, the information represented by the shared information may not be included in each set of the decoder initialization information.

For example, the shared information may include shared maximum bit depth information and shared maximum chroma format information. The shared maximum bit depth information may specify a common maximum bit depth of each color component of pictures in all sets of the decoder initialization information. When the information related to the decoder initialization includes the shared maximum bit depth information, each set of the decoder initialization information may not include the maximum bit depth information. The shared maximum chroma format information may specify a common maximum value of the syntax element sps_chroma_format_idc of the SPS referenced by pictures in all sets of the decoder initialization information. When the information related to decoder initialization includes the shared maximum chroma format information, each set of the decoder initialization information may not include maximum chroma format information.

In an embodiment, the bitstream may have the same profile and tier across a coded video sequence (CVS). More specifically, if information related to decoder initialization or decoder initialization information is present, the associated bitstream/sub-bitstream may have the same profile and tier across the coded video sequences (CVS(s)). That is, the entire bitstream/sub-bitstream may conform to one profile and one tier.

The decoding apparatus may perform decoder initialization based on information related to decoder initialization (S810).

The decoding apparatus may perform the decoding after decoder initialization (S820). More specifically, the decoding apparatus may perform a decoding process after performing decoder initialization based on the information related to decoder initialization.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The method according to the above-described embodiments of the present document may be implemented in software form, and the encoding apparatus and/or decoding apparatus according to the present document is, for example, may be included in the apparatus that performs the image processing of a TV, a computer, a smart phone, a set-top box, a display device, and so on.

When the embodiments in the present document are implemented in software, the above-described method may be implemented as a module (process, function, and so on) that performs the above-described function. A module may be stored in a memory and executed by a processor. The memory may be internal or external to the processor, and may be coupled to the processor by various well-known means. The processor may include an application-specific integrated circuit (ASIC), other chipsets, logic circuits, and/or data processing devices. Memory may include read-only memory (ROM), random access memory (RAM), flash memory, memory cards, storage media, and/or other storage devices. That is, the embodiments described in the present document may be implemented and performed on a processor, a microprocessor, a controller, or a chip. For example, the functional parts shown in each figure may be implemented and performed on a computer, a processor, a microprocessor, a controller, or a chip. In this case, information on instructions or an algorithm for implementation may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (i.e., vehicle user equipment, an airplane user equipment, a ship user equipment, and so on) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present document is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (i.e., transmission through the Internet). In addition, a bitstream generated by the encoding method may be stored in a computer-readable recording medium or may be transmitted over wired/wireless communication networks.

In addition, the embodiments of the present document may be implemented with a computer program product according to program codes, and the program codes may be performed in a computer by the embodiments of the present document. The program codes may be stored on a carrier which is readable by a computer.

Figure 9:
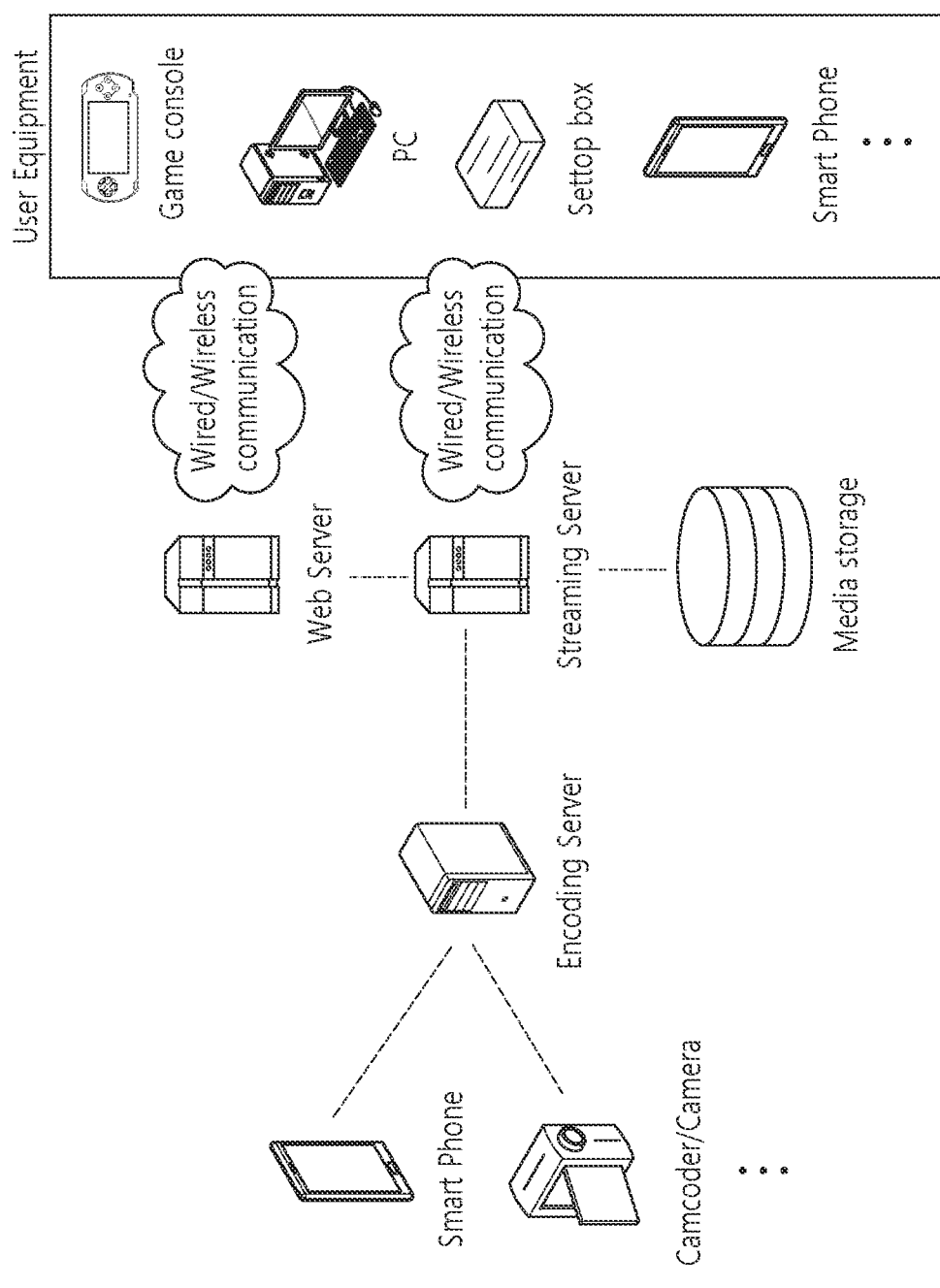
FIG. 9 shows an example of a content streaming system to which the disclosure of the present document may be applied.

FIG. 9 shows an example of a content streaming system to which embodiments disclosed in the present specification may be applied.

Referring to FIG. 9, the content streaming system to which the embodiment(s) of the present document is applied may largely include an encoding server, a streaming server, a web server, a media storage, a user device, and a multimedia input device.

The encoding server compresses content input from multimedia input devices such as a smartphone, a camera, a camcorder, and so on. Into digital data to generate a bitstream and transmit the bitstream to the streaming server. As another example, when the multimedia input devices such as smartphones, cameras, camcorders, and so on, directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., Smartwatches, smart glasses, head mounted displays), digital TVs, desktops computer, digital signage, and the like. Each server in the content streaming system may be operated as a distributed server, in which case data received from each server may be distributed.

Each server in the content streaming system may be operated as a distributed server, and in this case, data received from each server may be distributed and processed.

The claims described herein may be combined in various ways. For example, the technical features of the method claims of the present document may be combined and implemented as an apparatus, and the technical features of the apparatus claims of the present document may be combined and implemented as a method. In addition, the technical features of the method claim of the present document and the technical features of the apparatus claim may be combined to be implemented as an apparatus, and the technical features of the method claim of the present document and the technical features of the apparatus claim may be combined and implemented as a method.

What is claimed is:

1. An image decoding method performed by a decoding apparatus, the method comprising:

obtaining initialization information related to initialize a decoder from bitstream;

initializing the decoder based on the initialization information; and decoding image information in the bitstream after initializing the decoder, wherein the initialization information comprises:

number information specifying a number of decoder initialization sets in the initialization information, a maximum bit depth indicating a maximum bit depth of the image information to be decoded, the maximum bit depth being shared by all decoder initialization sets in the initialization information, and a maximum chroma format indicating a maximum chroma format of the image information to be decoded, the maximum chroma format being shared by all decoder initialization sets in the initialization information, and wherein each decoder initialization set comprises:

level id information, wherein a value of the level id information specifies a level related to a corresponding decoder initialization set, and maximum value information on parameters for decoding the bitstream related to the level id information, wherein the initialization information is included in a Decoding Capability Information (DCI) Network Abstraction Layer (NAL) unit in the bitstream, and wherein the decoder initialization sets are arranged based on descending order of the value of the level id information.

2. The method of claim 1, wherein the maximum value information on the parameters comprises: maximum DPB size information, and maximum picture size information, wherein the maximum DPB size information specifies maximum DPB size required for decoding the bitstream conforming to a level equal to or less than the level specified by the level id information, and wherein the maximum picture size information specifies maximum picture size of a picture in the bitstream conforming to a level equal to or less than the level specified by the level id information.

3. The method of claim 2, wherein the maximum value information on the parameters further comprises: maximum bit-depth information, and maximum chroma format information, wherein the maximum bit-depth information specifies maximum bit-depth of each color component of the picture in the bitstream conforming a level equal to or less than the level specified by the level id information, and wherein the maximum chroma format information specifies maximum value of syntax element sps_chroma_format_idc in SPS (sequence parameter set) referenced by the picture in the bitstream conforming to a level equal to or less than the level specified by the level id information.

4. An image encoding method performed by an encoding apparatus, the method comprising:

deriving initialization information related to initialize a decoder; and generating a bitstream by encoding the initialization information and image information, wherein the initialization information comprises:

number information specifying a number of decoder initialization sets in the initialization information, a maximum bit depth indicating a maximum bit depth of the image information to be decoded, the maximum bit depth being shared by all decoder initialization sets in the initialization information, and a maximum chroma format indicating a maximum chroma format of the image information to be decoded, the maximum chroma format being shared by all decoder initialization sets in the initialization information, wherein each decoder initialization set comprises:

level id information, wherein a value of the level id information specifies a level related to a corresponding decoder initialization set, and maximum value information on parameters for bitstream related to the level id information, wherein the initialization information is included in a Decoding Capability Information (DCI) Network Abstraction Layer (NAL) unit in the bitstream, and wherein the decoder initialization sets are arranged based on descending order of the value of the level id information.

5. The method of claim 4, wherein the maximum value information on the parameters comprises: maximum DPB size information, and maximum picture size information, wherein the maximum DPB size information specifies maximum DPB size for the bitstream conforming to a level equal to or less than the level specified by the level id information, and wherein the maximum picture size information specifies maximum picture size of a picture in the bitstream conforming to a level equal to or less than the level specified by the level id information.

6. The method of claim 5, wherein the maximum value information on the parameters further comprises: maximum bit-depth information, and maximum chroma format information, wherein the maximum bit-depth information specifies maximum bit-depth of each color component of the picture in the bitstream conforming a level equal to or less than the level specified by the level id information, and wherein the maximum chroma format information specifies maximum value of sps_chroma_format_idc in SPS (sequence parameter set) referenced by the picture in the bitstream conforming to a level equal to or less than the level specified by the level id information.

7. A method for transmitting data for image information, the method comprising:

generating a bitstream, wherein the bitstream is generated based on:

deriving initialization information related to initialize a decoder, and generating bitstream by encoding the initialization information and image information; and transmitting the data comprising the bitstream;

wherein the initialization information comprises:

number information specifying a number of decoder initialization sets in the initialization information, a maximum bit depth indicating a maximum bit depth of the image information to be decoded, the maximum bit depth being shared by all decoder initialization sets in the initialization information, and a maximum chroma format indicating a maximum chroma format of the image information to be decoded, the maximum chroma format being shared by all decoder initialization sets in the initialization information, wherein each decoder initialization set comprises:

level id information, wherein a value of the level id information specifies a level related to a corresponding decoder initialization set, and maximum value information on parameters for bitstream related to the level id information, wherein the initialization information is included in a Decoding Capability Information (DCI) Network Abstraction Layer (NAL) unit in the bitstream, and wherein the decoder initialization sets are arranged based on descending order of the value of the level id information.

\* \* \* \* \*